United States Patent
Jouppi

(10) Patent No.: US 7,593,546 B2
(45) Date of Patent: Sep. 22, 2009

(54) TELEPRESENCE SYSTEM WITH SIMULTANEOUS AUTOMATIC PRESERVATION OF USER HEIGHT, PERSPECTIVE, AND VERTICAL GAZE

(75) Inventor: Norman Paul Jouppi, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1221 days.

(21) Appl. No.: 10/386,984

(22) Filed: Mar. 11, 2003

(65) Prior Publication Data

US 2004/0179714 A1    Sep. 16, 2004

(51) Int. Cl.
G06K 9/00 (2006.01)
H04N 5/232 (2006.01)
G06F 19/00 (2006.01)

(52) U.S. Cl. .................. 382/103; 382/153; 348/211.12; 700/245; 700/259

(58) Field of Classification Search ................. 382/103, 382/153; 348/211.12; 700/259, 245
See application file for complete search history.

(56) References Cited

U.S. PATENT DOCUMENTS

| | | | | |
|---|---|---|---|---|
| 5,400,069 A | * | 3/1995 | Braun et al. | 348/14.16 |
| 5,438,357 A | * | 8/1995 | McNelley | 348/14.1 |
| 5,500,671 A | * | 3/1996 | Andersson et al. | 348/14.1 |
| 5,572,248 A | * | 11/1996 | Allen et al. | 348/14.1 |
| 5,684,531 A | * | 11/1997 | Li et al. | 348/139 |
| 6,148,100 A | * | 11/2000 | Anderson et al. | 382/153 |
| 6,292,713 B1 | * | 9/2001 | Jouppi et al. | 700/245 |
| 6,604,021 B2 | * | 8/2003 | Imai et al. | 700/245 |
| 6,798,457 B2 | * | 9/2004 | Boyden et al. | 348/373 |
| 6,879,879 B2 | * | 4/2005 | Jouppi et al. | 700/259 |
| 6,914,622 B1 | * | 7/2005 | Smith et al. | 348/14.05 |
| 6,925,357 B2 | * | 8/2005 | Wang et al. | 700/245 |
| 2002/0118861 A1 | | 8/2002 | Jouppi et al. | |
| 2003/0234772 A1 | * | 12/2003 | Zhang et al. | 345/177 |
| 2004/0130614 A1 | * | 7/2004 | Valliath et al. | 348/14.01 |

OTHER PUBLICATIONS

Jouppi, Norman P. "First Steps Towards Mutually-Immersive Mobile Telepresence". Proceedings of the 2002 ACM Conference on Computer Supported Cooperative Work: Nov. 16-20, 2002. pp. 354-363.*

* cited by examiner

Primary Examiner—Daniel G Mariam
Assistant Examiner—Manav Seth

(57) ABSTRACT

A method for mutually-immersive telepresencing is provided with a view of a surrogate's location. An image of the surrogate's location is displayed at a user's location. A user's eye level and perspective are sensed. The height of the camera and image of the user's eyes at the surrogate's location are adjusted to match the height of the user's eyes. The user's perspective and, hence, gaze are preserved on the image while the user's eye level changes.

20 Claims, 6 Drawing Sheets

TELEPRESENCE SYSTEM WITH SIMULTANEOUS AUTOMATIC PRESERVATION OF USER HEIGHT, PERSPECTIVE, AND VERTICAL GAZE

CROSS-REFERENCE TO RELATED APPLICATIONS

The present application contains subject matter related to U.S. patent application Ser. No. 09/784,902, now U.S. Pat. No. 6,785,402, by Norman Jouppi and Subramonium Iyer titled "Head Tracking and Color Video Acquisition Via Near Infrared Luminance Keying".

The present application also contains subject matter related to U.S. patent application Ser. No. 10/285,757, now U.S. Pat. No. 6,879,879, by Norman Paul Jouppi and Vaughan Stanton Thomas entitled "Telepresence System with Automatic User-Surrogate Height Matching".

The present application further contains subject matter related to U.S. patent application Ser. No. 10/319,911, now U.S. Pat. No. 6,889,120, by Norman Paul Jouppi entitled "Mutually-immersive Mobile Telepresence with Gaze and Eye Contact Preservation".

BACKGROUND

1. Technical Field

The present invention relates generally to videoconferencing and more specifically to telepresence systems.

2. Background Art

In the past, video camera and audio systems were developed for improving communication among individuals who are separated by distance and/or time. The system and the process are now referred to as "videoconferencing". Videoconferencing sought to duplicate, to the maximum extent possible, the full range, level and intensity of interpersonal communication and information sharing which would occur if all the participants were "face-to-face" in the same room at the same time.

Behavioral scientists know that interpersonal communication involves a large number of subtle and complex visual cues, referred to by names like "eye contact" and "body language," which provide additional information over and above the spoken words and explicit gestures. These cues are, for the most part, processed subconsciously by the participants, and often communicate information, which cannot be communicated in any other fashion.

In addition to spoken words, demonstrative gestures, and behavioral cues, face-to-face contact often involves sitting down, standing up, and moving around to look at objects or charts. This combination of spoken words, gestures, visual cues, and physical movement significantly enhances the effectiveness of communication in a variety of contexts, such as "brainstorming" sessions among professionals in a particular field, consultations between one or more experts and one or more clients, sensitive business or political negotiations, etc. In situations where the participants cannot be in the same place at the same time, the beneficial effects of face-to-face contact will be realized only to the extent that each of the remotely located participants can be "recreated" at each site.

Although videoconferencing has come into widespread use, it is still of limited use because of the inability to very closely approximate for a user the recreation of the remotely located participants. The systems generally use fixed-location cameras and conference-type telephones. There is no sense of the presence of the user being at the site of a remote meeting or of the presence of the remotely located participants being with the user.

To overcome these problems, a system called "robotic telepresence" has been developed. In robotic telepresence, a remotely controlled robot simulates the presence of the user for the remotely located participants. The user has a freedom of motion and control over the robot and video input that is not present in traditional videoconferencing, and this better simulates the feeling of the user being present in person at a remote site. The overall experience for the user and the people interacting with the robotic telepresence device is very much superior to videoconferencing.

The robot platform typically includes a camera, a display device, a motorized platform that includes batteries, a control computer, and a wireless computer network connection. An image of the user is captured by a camera at the user's location and displayed on the display of the robotic telepresence device in the remote site.

More recently, a robotic telepresence system has been developed, which has a user station at a first geographic location and a robot at a second geographic location. The user station is responsive to a user and communicates information to and from the user. The robot is coupled to the user station and provides a three dimensional representation of the user transmitted from the user station. The robot also senses predetermined types of information and communicates the sensed information back to the user to provide a representation for the user of the robot's surroundings.

Additionally, a system has been developed for head tracking and color video acquisition via near-infrared luminance keying where the head of a user is tracked in real time. A near-infrared camera is equipped with filters that discern the difference between a near-infrared light illuminated rear projection screen behind the user and any foreground illumination to acquire a near-infrared image of the user. A color image of the user's head and the projection of a remote location are acquired by a color camera placed in close proximity to the near-infrared camera. A bounding box is placed around the near-infrared image of the user's head and translated to the view space of the color camera. The translated image is used to crop the color image of the user's head for transmission to the remote location.

However, there are many problems that still need to be addressed to provide improved robotic telepresence realism; i.e., to make the user appear to be present in person.

Solutions to problems of this sort have been long sought, but have long eluded those skilled in the art.

DISCLOSURE OF THE INVENTION

The present invention provides a method and system for mutually-immersive telepresencing with a view of a surrogate's location. An image of the surrogate's location is displayed at a user's location where a user's eye level and height are sensed. The user's gaze is preserved on the image while the user's eye level changes. This method provides a means to more closely simulate the feeling of the actual presence of a user during conferencing by preserving the gaze between the user and participants and providing other communication cues.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

The present invention relates to a Mutually-Immersive Mobile Telepresence (E-Travel) System. The user sits in front of a display showing the remote location and a robot device is located at a remote location having a display of the user. Video and audio are transmitted between the display and the robot device. The robot device may have a humanoid as well as a non-humanoid shape, and is referred to as a "surrogate".

A goal of the Mutually-Immersive Mobile Telepresence System is to recreate to the greatest extent possible, both for the user and the people or participants at the remote location, the sensory experience relevant for business interactions of the user of actually being in the remote location.

Behavioral scientists know that interpersonal communication involves a large number of subtle and complex visual cues, referred to by names like "gaze" and "eye contact," which provide additional information over and above the spoken words and explicit gestures. "Gaze" relates to others being able to see where a person is looking and "eye contact" relates to the gazes of two persons being directed at the eyes of the other. These cues are, for the most part, processed subconsciously by the people, and often communicate vital information.

During human interactions, the sitting or standing position of people conveys information to other people. For example, during business meetings, people typically sit in chairs while only the presenter stands. However, at the conclusion of meetings everyone usually stands up and visits with each other in small groups. As another example, when a person visits someone's office, the visitor is initially standing and the office occupant is sitting. The person who is visiting may be asked to sit down by the office occupant, or may do so themselves depending on the context. In general people find it awkward to be standing while others are sitting or vice-versa. Thus, it is desirable for the user to conform to the sitting or standing position of other people in both a business and social context.

Figure 1:
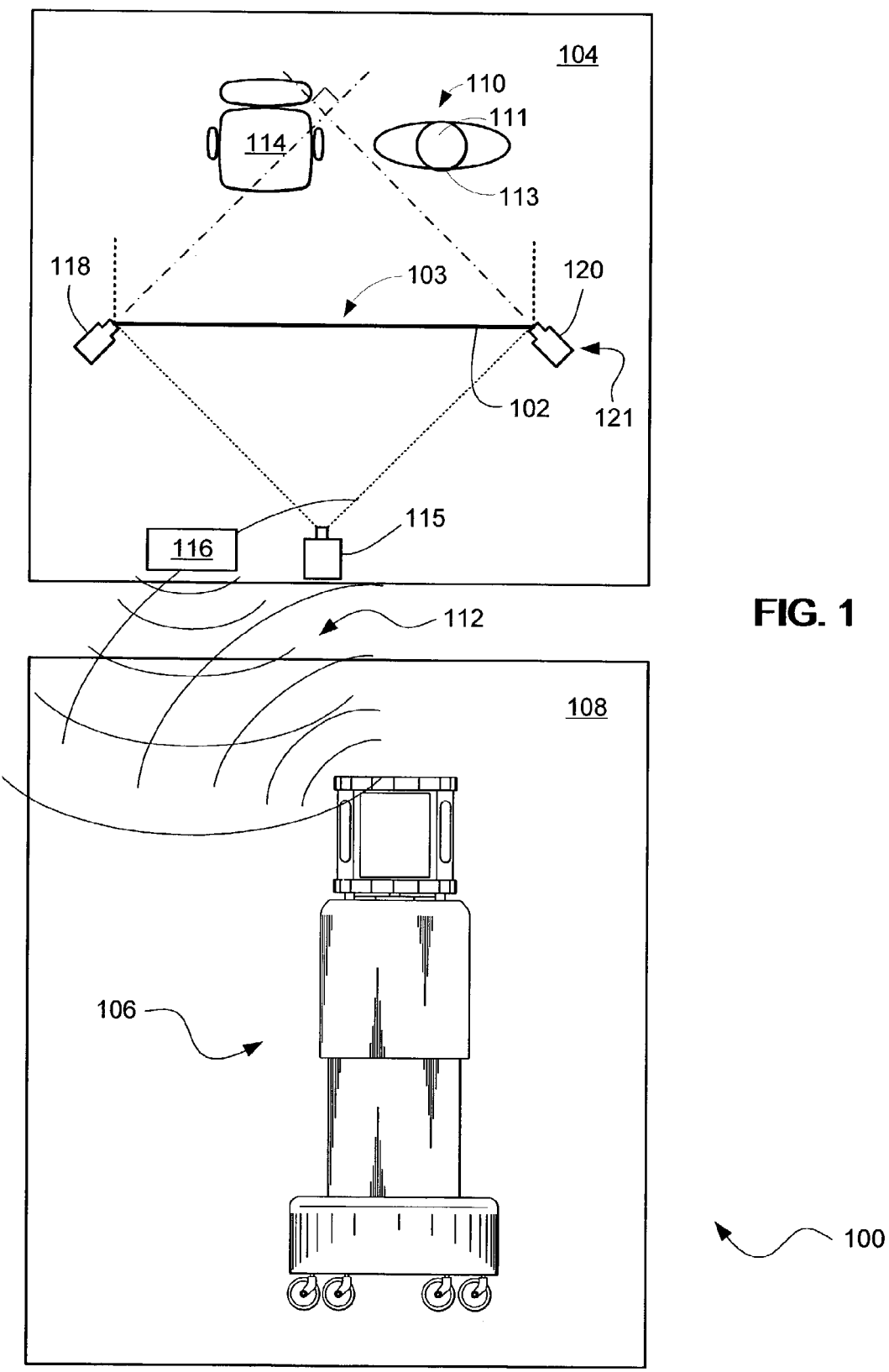
FIG. 1 is an overview of a Mutually-Immersive Mobile Telepresence System.

Preservation of User Height:

Referring now to FIG. 1, therein is shown a Mutually-Immersive Mobile Telepresence System 100. The system 100 includes a user's display 102 having a full-size view of a surrogate's location image 103 at a user's location 104 and a robotic device or a surrogate 106 at a surrogate's location 108.

A user 110 may sit in a chair 114 or stand with the user's head 111 and the user's face 113 facing the user's display 102 on which the surrogate's location image 103 may be back-projected from a projector 115. The surrogate 106 is connected to the user's display 102 via a high-speed network 112 through a user's transceiver-computer system 116, which includes a portion of the user gaze preservation system.

First and second camera sets 118 and 120 are set a the corners of the user's display 102 at an angle of 90 degrees relative to each other, pointing toward the user 110 in front of the user's display 102 to view the user 110 and transmit information regarding the user's head 111 or the user's face 113 to the surrogate 106.

The height of the user's head 111 is measured by using one of several similar techniques. In a first technique, the user 110 is surrounded by a chroma-key blue background. The user's head 111 can be distinguished from the background in the images provided by the first and second camera sets 118 and 120. Knowing heights of and the angle between the first and second camera sets 118 and 120 and the field of view of the images, the height of the user's head 111 can be determined by triangulation. In a second technique, the user's head height can be similarly measured using near-infrared (NIR) difference keying.

After the height of the user's head 111 is measured, the information is transmitted via the high-speed network 112 to the surrogate 106.

The first and second camera sets 118 and 120 each contain two video cameras at different heights for respectively viewing the user 110 in a seated and standing positions. By selecting an upper or lower video camera, it is possible to capture images with a good perspective of the user's head 111. In other words, for a short user 110, the images will not be looking down on the user's head 111 and, for a tall user 110, the images will not be looking up at the user's chin.

Figure 2:
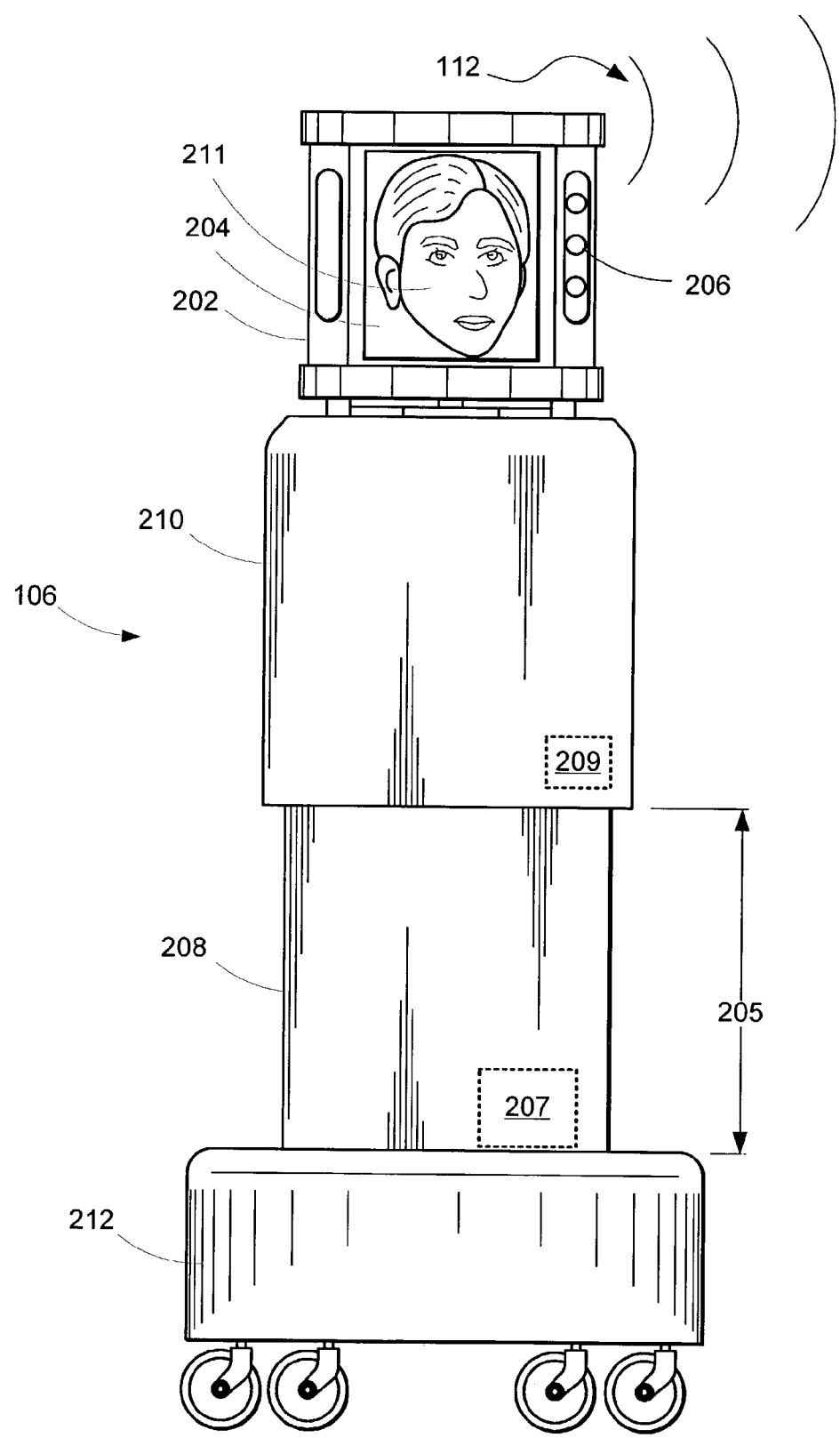
FIG. 2 is a surrogate in accordance with the present invention.

Referring now to FIG. 2, therein is shown the surrogate 106 in accordance with the present invention. The surrogate 106 has a surrogate's head 202 having one or more surrogate's face displays 204, which could be made of one or more liquid crystal display (LCD) panels. In one embodiment, there are four surrogate's face displays 204. The surrogate's face displays 204 are for displaying a head image 211 of the user's head 111 of FIG. 1 with good perspective as explained above.

One or more surrogate's cameras 206 in the surrogate's head 202 capture live video images at the surrogate's location 108. The live video images from the surrogate's cameras 206 in the surrogate's head 202 are compressed and transmitted over the high-speed network 112 by a surrogate's transceiver-computer system 207 in the surrogate 106 to the user's transceiver-computer system 116 (shown in FIG. 1) at the user's location 104. The user's transceiver-computer system 116 provides the surrogate's location image 103 to the projector 115 of FIG. 1.

The surrogate's location image 103 is presented "life-size". This means that the angle subtended by objects on the user's display 102 is roughly the same angle as if the user 110 (in FIG. 1) were actually at the surrogate's location 108 (of FIG. 1) directly viewing the objects. Images are not presented at life-size in conventional videoconferencing systems. The surrogate's location image 103 must be presented at life-size in the present invention in order for the user's gaze to be accurately preserved at more than one point. For example, if images are not presented at life-size, a movement of the user's eyes by X degrees to the left will not be directed at objects X degrees to the left of the surrogate's face displays 204 at the surrogate's location 108 (e.g., X=30 degrees).

The surrogate 106 is made in two parts that are movable relative to each other over a distance 205. One part is a leg portion 208 and one part is a torso portion 210. A monitor 209 is connected to the surrogate's transceiver-computer system 207 to sense the extension or height of the torso portion 210 relative to the leg portion 208. The surrogate's head 202 is mounted above the torso portion 210, and the torso portion 210 may be raised or lowered relative to the leg portion 208 so as to raise or lower the surrogate's head 202 relative to the surface on which the surrogate 106 moves or is moved. The surrogate 106 includes a drive portion 212, which permits movement of the surrogate 106.

One of the key components of the system 100 is the preserving of the gaze between user and participants so as to allow each person to know what the other person is paying attention to and providing other communication cues. To do this, it has been discovered that it is necessary to preserve both the user's height and vertical gaze in the surrogate 106.

To preserve both the user's height and vertical gaze, it is necessary to use the height of the user's head 111 in either the user's sitting and standing positions and an image of the user's head 111.

The surrogate 106 receives information about the height of the user's head 111 from the user's transceiver-computer system 116 at the user's location 104, and the surrogate's transceiver-computer system 207 in the surrogate 106 then automatically raises or lowers the surrogate's head 202 so that the image of the user's head 111 is at about the same height as the user's head 111 at the user's location 104. This automatic preservation of user height recreates, or preserves, the same height by measuring a current extension or height of the torso portion 210 relative to the leg portion 208, knowing the position of the top of the user's head 111 in the displayed image, and then increasing or decreasing the distance 205 if the surrogate's extension to match the user's height.

To preserve the user's vertical gaze while the user's head height changes, there are three main approaches, which may be taken either singularly or in combination, as exemplified in the following figures.

Figure 3B:
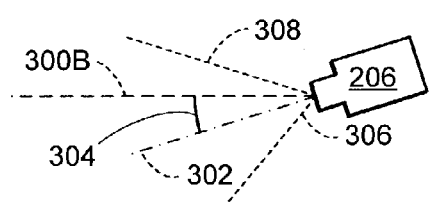
FIGS. 3A and 3B show a fixed-tilt surrogate's camera at different heights in accordance with a first embodiment of the present invention.
Figure 3A:
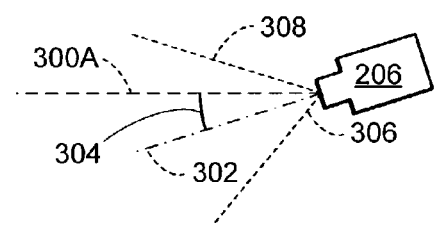

Preservation of Vertical Gaze Using Fixed-Tilt Surrogate's Camera:

Referring now to FIGS. 3A and 3B, therein are shown a fixed-tilt surrogate's camera 206 at different heights in accordance with a first embodiment of the present invention. FIGS. 3A and 3B respectively show the fixed-tilt surrogate's camera 206 with horizontal planes 300A and 300B respectively indicating the height automatically preserving the height of a seated user 110 and a standing user 110. The surrogate's camera 206 has a centerline of view 302, which is tilted Y degrees 304 below the horizontal plane 300A or 300B.

The horizontal planes 300A and 300B are vertically centered on the same height as where the eye level of the user's head image 211 appears on the surrogate 106 of FIG. 2. The surrogate's camera 206 has a vertical field of view from a line 306 to a line 308 and moves vertically with the surrogate's head 202 of FIG. 2 over the distance 205 of FIG. 2.

Figure 4:
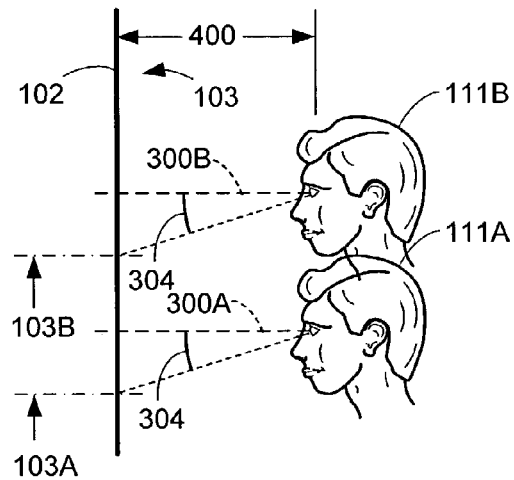
FIG. 4 is a view of the user's display with the user's head while the user is in seated and standing positions.

Referring now to FIG. 4, therein is shown the user's display 102 and the user's head 111A while the user 110 is seated, and the user's head 111B while the user 110 is standing. The user's eyes are located a distance 400, or about 30 inches, from the user's display 102.

Because most users are with in a foot of each other in height, for standing or sitting users (but not switching between sitting and standing), the overall height difference is usually within 6 inches of the center of the surrogate's location image 103 (assuming the surrogate's location image 103 is centered around the average sitting or standing height, whichever position the user 110 will be using the system in).

It has been found that the user's field of view in both standing and seated positions will be centered Y degrees 304, or about 10°, below the horizontal plane 300A or 300B to the vertical centers 103A and 103B of the surrogate's location image 103, respectively, based on the seated and standing height of the user's eye levels. Thus, when the user's eye level changes height, the surrogate's location image 103 on the user's display 102 should be changed accordingly so the center of the surrogate's location image 103 is still Y degrees 304 below the horizontal when measured from the user's eyes.

It has been discovered that at a distance to the user's display 102 of about 30 inches, there is a gaze difference or gaze error in the vertical direction of about 12 degrees for the different height users. However, it has also been discovered that participants at the surrogate's location 108 of FIG. 1 are less sensitive to gaze errors in the vertical direction rather than in the horizontal direction because the whites of the user's eyes are not as visible above and below the cornea as they are beside it so this not present a major problem and good vertical gaze is preserved with the fixed-tilt camera 206.

If this gaze error is unacceptable, more cameras at different heights can be used. In one embodiment, four cameras are used.

It has also been found that, when the surrogate's location image 103 is moved up and down with the user 110 for simultaneous automatic preservation of user height and vertical gaze, the same amount of imagery above and below the horizontal plane 300A or 300B is always presented to the user 110 independent of whether the user 110 is sitting or standing.

There are a number of ways in which the height of the center of the surrogate's location image 103 can be changed between the vertical centers 103A and 103B. Two examples are shown in FIGS. 5 and 6.

Figure 5:
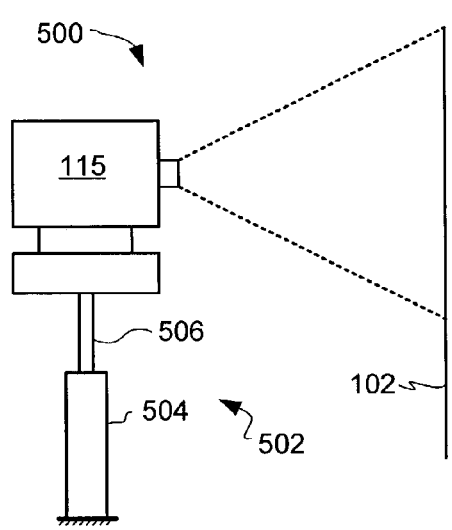
FIG. 5 is a view of a movable projection system.

Referring now to FIG. 5, therein is shown a movable projection system 500. The movable projection system 500 includes a lift mechanism 502, which could consist of a cylinder 504 and a piston 506 to move the projector 115 by a significant amount. The lift mechanism 502 will allow the projector 115 to move an image up and down on the user's display 102.

Figure 6:
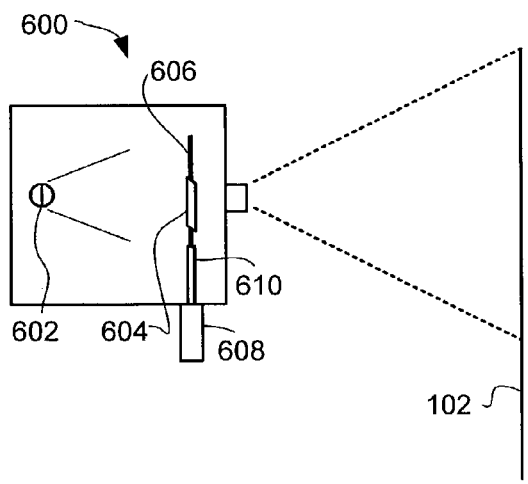
FIG. 6 is a view of a projected image movement system.

Referring now to FIG. 6, therein is shown an alternative embodiment of a projected image movement system 600. The system 600 includes an optical system including a projection lamp 602 supplying light for an imager 604. The imager 604 can be a liquid crystal panel, equivalent light valve, or mirror assembly. The imager 604 is surrounded by a baffle 606 so the imager 604 and the baffle 606 can be moved by a piston 610 in a cylinder 608 to allow an image to be projected at different heights on the user's display 102.

Camera Distortion:

When the surrogate's camera 206 is fixed in position with a centerline of view 302, which is Y degrees 304 below the horizontal planes 300A or 300B (as shown in FIGS. 3A or 3B), a problem has been encountered in that the surrogate's location image 103 is distorted for objects that are not on the centerline of view 302 of FIG. 3A or 3B. For example, a vertical rectangular chart in front of the tilted surrogate's camera 206 will appear distorted as a bowed trapezoidal image in the user's display 102 (of FIG. 1).

Figure 7:
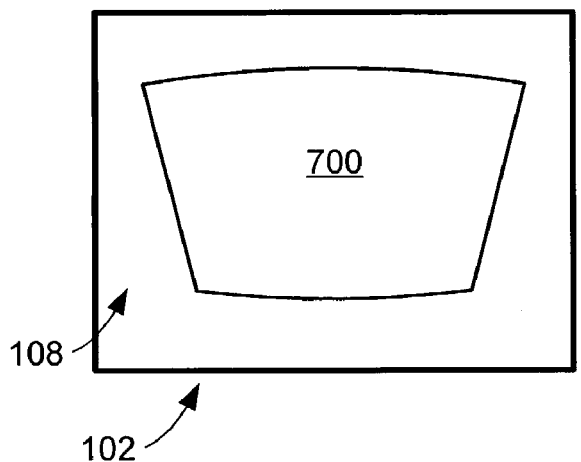
FIG. 7 is a user's display with viewed image.

Referring now to FIG. 7, therein is shown the user's display 102 on which a vertical rectangular chart at a surrogate's location 108 (of FIG. 1) appears as a bowed trapezoidal image 700 due to the perspective viewed by the surrogate's cameras 206 (of FIG. 2). The longer side of the bowed trapezoidal image 700 is in the direction of the camera tilt. This warping makes printing or writing on the bowed trapezoidal image 700 difficult to read.

Figure 8:
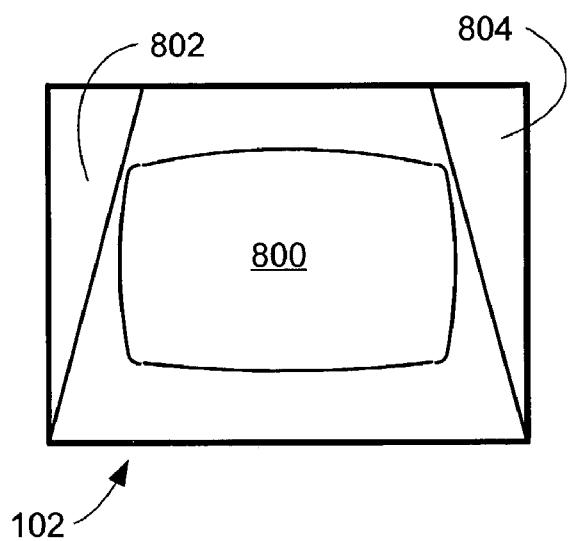
FIG. 8 is the image of FIG. 7 after unwarping in accordance with the present invention.

Referring now to FIG. 8, therein is shown the bowed trapezoidal image 700 of FIG.7 after unwarping to make it easier to read. It is desirable to unwrap the bowed trapezoidal image 700 into a regular trapezoidal image 800 with two inverted triangles 802 and 804 representing the area beyond those contained in the original image viewed by the surrogate's camera 206.

Figure 9:
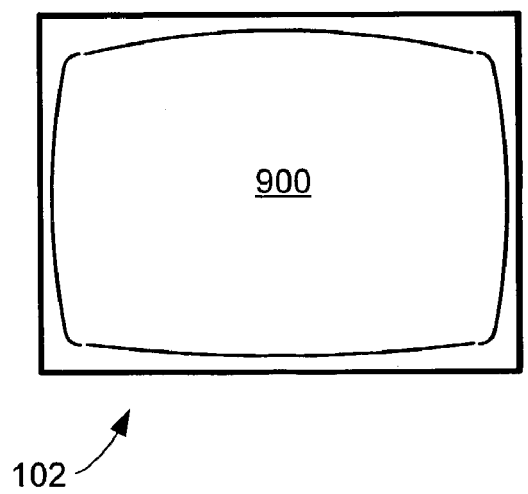
FIG. 9 is the image of FIG. 8 after cropping in accordance with the present invention.

Referring now to FIG. 9, therein is shown the image of FIG. 8 after cropping. The cropping removes the inverted triangles 802 and 804 of FIG. 8 and shows the regular trapezoidal image 800 as a perspective distortion reduced rectangular image 900.

Figure 10B:
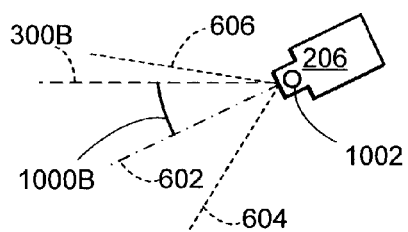
FIGS. 10A and 10B show a movable-tilt surrogate's camera at different heights in accordance with a second embodiment of the present invention.
Figure 10A:
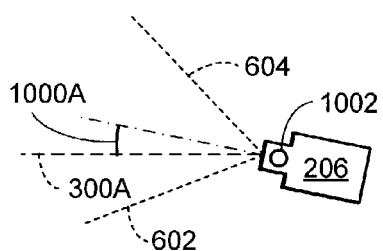

Preservation of Vertical Gaze Using Tilting Surrogate's Camera:

Referring now to FIG'S. 10A and 10B, therein is shown the surrogate's camera 206 equipped with a tilting mechanism 1002 at different heights in accordance with a second embodiment of the present invention. The tilting mechanism 1002 is powered and permits the surrogate's camera 206 to be pivoted above a horizontal axis from an angle 1000A as shown in FIG. 10A to an angle 1000B as shown in FIG. 10B, respectively, with respect to the horizontal planes 300A and 3B.

It has been discovered that when the user 110 moves from a sitting position to a standing position and vice versa, the direction of the user's gaze usually changes. When people are sitting in a meeting, they tend to look up at a projection screen or across at other people. However, when people are standing, they typically look across at other people or look down.

This led to a counterintuitive discovery that it is desirable to have a vertical center 103C of the surrogate's location image 103 move in an inverse direction opposite the direction of movement of the user's head 111; e.g., the surrogate's location image 103 to move up when the user 110 sits down, and down when the user 110 stands up.

Figure 11:
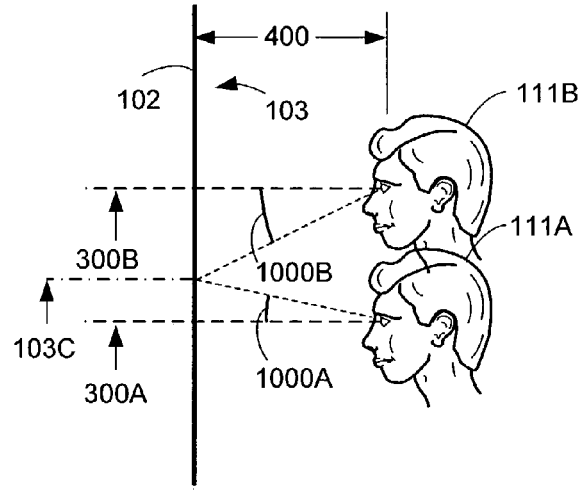
FIG. 11 shows the surrogate's location image maintained at a vertical center of the user's display.

Referring now to FIG. 11, therein is shown the user's display 102 in which the surrogate's location image 103 is maintained on the user's display 102 with the center of the surrogate's location image 103 at a vertical center 103C. The user's head 111A in a seated position and the user's head 111B in a standing position are both located the distance 400 (of FIG. 4) from the user's display 102.

In the seated position, the user's head 111A will have an eye level at the horizontal plane 300A and will form the angle 1000A up to the vertical center 103C. In the standing position, the user's head 11B will have an eye level at the horizontal plane 103B and the eyes will form the angle 1000B down to the vertical center 103C.

The surrogate's camera 206 is moved or tilted so that the angle between the user's eyes and the vertical center 103C of the sufrogate's location image 103 is the angle of the camera's tilt. For example, if the vertical center 103C of the surrogate's location image 103 is at the user's eye level, the surrogate's camera 206 would be level and pointing at the horizon.

It has been further discovered that a system 100 with a surrogate's location image 103 that is 36 inches tall covering a vertical field of view of 68 degrees, and, hence, viewing a 90 degree horizontal field of view, with a user's display 102 centered 56 inches above the floor, will have a certain desirable configuration.

If a six-foot three-inch tall person stands such that the distance 400 is 30 inches away from the user's display 102, assuming that the user's eye level is four inches below the top of the user's head 111B at 71 inches above the floor, the angle 1000B would be 27 degrees down from the user's eye level to the vertical center 103C of the surrogate's location image 103. When the surrogate's camera 206 is tilted down by 27 degrees from the horizontal, the user's vertical gaze will be preserved at the surrogate's location 108 (of FIG. 1).

Similarly, if a five-foot tall person sits in front of the user's display 102 such that the distance 400 is 30 inches away from the user's display 102, assuming that the user's eye level is four inches below the top of the user's head 111A at 44 inches above the floor, the angle 1000A would be 22 degrees up to the vertical center 103C of the surrogate's location image 103. When the surrogate's camera 206 is tilted up by 22 degrees to the horizontal plane, the user's vertical gaze will be preserved at the surrogate's location 108 (of FIG. 1).

Thus, it has been discovered that a range of movement for the movable-tilt surrogate's camera 206 between 27 degrees down from the horizontal and 22 degrees up from the horizontal will preserve the gaze of more than 95% of the U.S. born adult population of potential users.

Although the tilting of the cameras may be a distraction for people at the surrogate's location 108, and the tilting of the cameras may cause additional communication delay time (generally on the order of 100 milliseconds), since small cameras can be moved faster than large projectors, the added delay will be more than made up for in the speed of motion.

In a general case, the following equation determines the desired angle of the surrogate's camera 206 at the surrogate's location 108. By trigonometry, if the distance from the user to the screen is $X_{us}$, and the distance from the user's eye $Y_e$ above the center of the projected image $Y_c$ is $Y_e - Y_c = Y_{ec}$, then the angled data between the user's eye in the center of the projected image is: $\emptyset = -\arctan(Y_{ec}/X_{us})$.

Note that if the user's eye level is below the vertical center, 103C of the surrogate's location image 103, the distance $Y_{ec}$ between the user's eye and the vertical center 103C will be negative, and the resulting angle will be positive (i.e., the surrogate's camera 206 should be pointed up above the horizontal).

Figure 12:
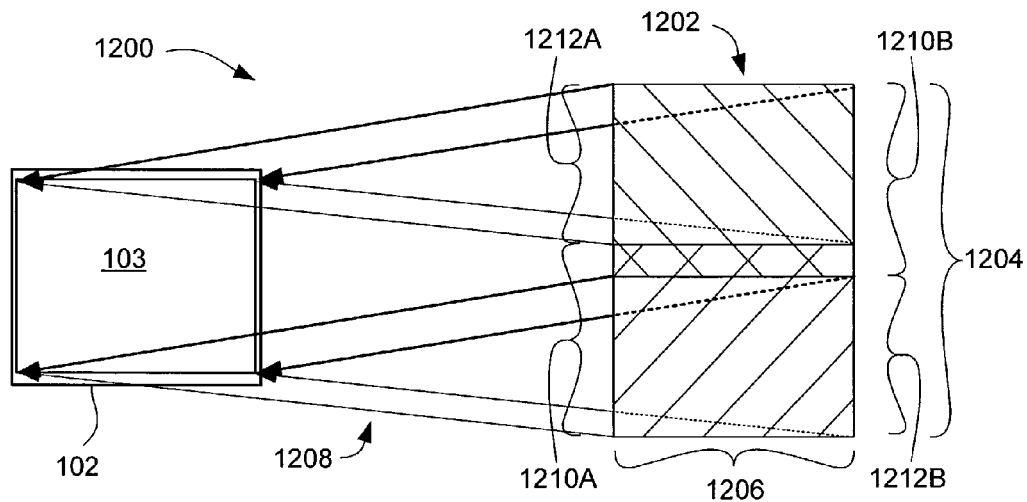
FIG. 12 is an illustration of electronic adjustment for preservation of vertical gaze in accordance with a third embodiment of the present invention.

Preservation of Vertical Gaze Using Electronic Image Processing:

Referring now to FIG. 12, therein is shown an illustration 1200 of electronic adjustment for preservation of vertical gaze. In this approach, the surrogate's camera 206 (of FIG. 2) would acquire a much larger surrogate's camera image 1202 than would be projected, such as the portrait image having a height 1204 and a width 1206.

The portion of the image required to preserve vertical gaze would be electronically selected from the surrogate's camera image 1202 in a computer (either the user's transceiver-computer system 116 of FIG. 1 or the surrogate's transceiver-computer system 207 of FIG. 2, which could optionally include a portion of the user gaze preservation system). The electronic selection can easily be accomplished by texture mapping 1208 of different portions of the surrogate's camera image 1202 to the user's display 102 to provide the surrogate's location image 103. Techniques for this are well known to those having ordinary skill in the art.

Thus, instead of tilting the surrogate's camera 206 between 27 degrees down and 22 degrees up to cover the range of the tall and short user as in the second embodiment, the surrogate's camera 206 will be required to cover a vertical field of view of 68+27+22, or 117 degrees. Then, in the case of the six-foot three-inch tall standing user, the top $^{68}/_{117}$th of the surrogate's camera image 1202, or the portion 1210B, would be used. And in the case of the five foot tall sitting user, the bottom $^{68}/_{117}{}^{th}$ of the surrogate's camera image 1202, or the portion 1210A, would be used to provide a landscape view of the surrogate's location image 103.

It will be understood that if the surrogate's camera 206 was oriented in a landscape orientation, in order to cover a range of 117 degrees in a vertical direction, a range of $2*\arctan[(4/3)*\tan(117/2)]=131$ degrees would have to be covered in the horizontal direction (because of the 3 high by 4 wide ratio of conventional video cameras). This is a very wide angle of view and is difficult to obtain without distortion and/or high cost.

In this case, a better option would be to orient the surrogate's camera 206 in a portrait mode. Then, an image spanning 117 degrees vertically would require a horizontal span of $2*\arctan[(3/4)*\tan(117/2)]=101$ degrees, which is much more manageable. If used as one side of a display cube wall, assuming a four-screen user's display 102, this would have to be increased slightly to more than 90 degrees, requiring a vertical field of view slightly more than 120 degrees.

One disadvantage of this alternative is that a large amount of image transmitted from the surrogate's location 108 is thrown away at the user's location 104, e.g., the portion 1212B. In the best case, where the surrogate's camera 206 is oriented in a portrait mode, $(117-68)/117=49/117=42\%$ of the image is discarded. Given that the resolution of the projected image is at a premium and almost an order of magnitude below what would be is desirable to reproduce human visual acuity, it is detrimental to have to discard almost half the transmitted image to preserve gaze.

A variant of this technique would be to texture map the image on the surrogate's transceiver-computer system 207 and compress and transmit only a portion of the image to be displayed for the user 110 based on directives from the user's transceiver-computer system 116. This would reduce the bandwidth wasted by discarding portions of the image at the user's location 104, but a significant portion of the surrogate's camera's resolution will still have to be discarded in either situation; e.g., portions 1212A or 1212B.

User Interface Metaphors

The following user-interface metaphors of the three alternatives will assist in understanding the present invention but should not be considered limiting.

In the first embodiment, the metaphor for the operation of the system is that of a mask fixed to the level of the user's head; as the as the user's head is raised up or down, the surrogate's location image on the display moves up and down, and the user's perspective shifts vertically without tilting. This is also similar to what happens when a user is wearing a motorcycle helmet that covers the user's chin and has a visor in front of the user's eyes. In this case, the user's window on the world moves up and down along with the user's head.

In the second of the embodiments, it is as if the user is standing or sitting in front of a wall containing a window. As the user moves up and down the window remains fixed, so the user's view through the window tilts up and down.

Given that the user's display will be at a distance from the user that more closely matches that experience of standing in front of a window rather than wearing a helmet, it is probably more intuitive and preferred to have a system that leverages the second metaphor.

As seen above, the preferred embodiment of the invention would be based on tilting the surrogate's cameras 206 to preserve gaze. This does not waste camera resolution or require the movement of either the projector 115 as a whole, its optical system, or the projected image.

However, the embodiments above can also be used in combination. The most advantageous combination is probably large-degree mechanical tilting of the surrogate's camera 206 combined with electronic fine-tuning of the gaze by discarding a small portion of the surrogate's location image. This would allow small changes in the user's head 111 position to be quickly compensated for without requiring frequent and relatively slow mechanical motion. For example, if the user 110 were sitting and leaned back or slouched, a small adjustment would be required. When the user 110 assumed a straighter sitting position, another small adjustment would be required. A combination of gross mechanical movement combined with fine electronic compensation could handle these situations more effectively than either alone.

From the above disclosure, it would be obvious to those having ordinary skill in the art that the present invention is adapted for simultaneous automatic preservation of user height and vertical gaze.

Figure 13:
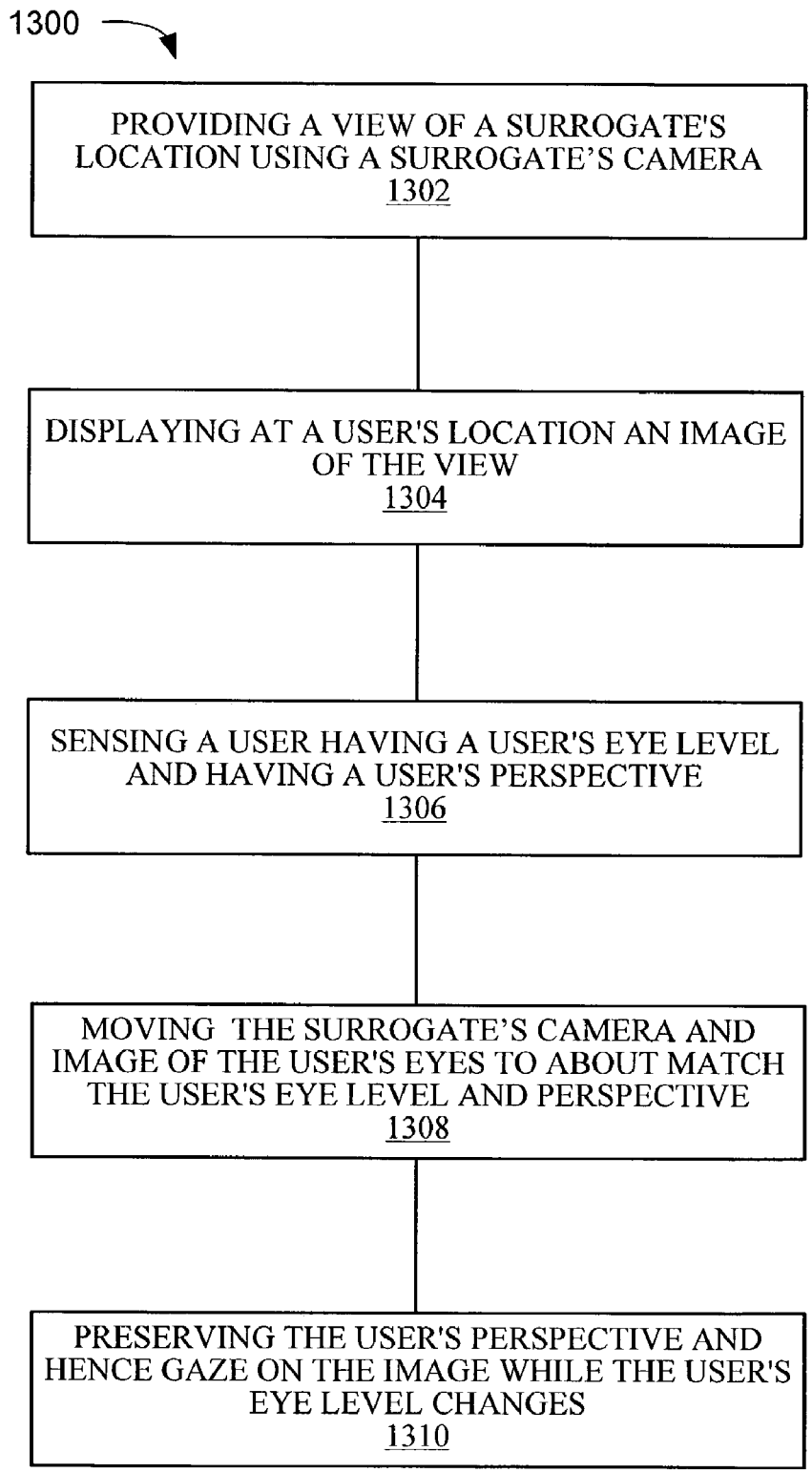
FIG. 13 is a method for mutually-immersive telepresencing according to the present invention.

Method of the Present Invention:

Referring now to FIG. 13, therein is shown a method 1300 for mutually-immersive telepresencing according to the present invention. The method 1300 includes: a step 1302 of providing a view of a surrogate's location using a surrogate's camera; a step 1304 of displaying at a user's location an image of the view; a step 1306 of sensing a user having a user's eye level and having a user's perspective; and a step 1308 of moving the surrogate's camera and image of the user's eyes to about match the user's eye level and perspective; a step 1310 of preserving the user's perspective and, hence, gaze on the image while the user's eye level changes.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations, which fall within the spirit and scope of the included claims. All matters hither-to-fore set forth herein or shown in the accompanying drawings are to be interpreted in an illustrative and non-limiting sense.

The invention claimed is:

1. A method for mutually-immersive telepresencing comprising:
   providing a view of a surrogate's location using a surrogate's camera;
   displaying at a user's location an image of the view;
   sensing a user having a user's eye level and having a user's perspective;
   moving the surrogate's camera to about match the user's eye level and perspective; and
   preserving the user's perspective and, hence, gaze on the image while the user's eye level changes, wherein preserving the user's gaze includes tilting the view of the surrogate's location while the user's eye level changes.

2. The method as claimed in claim 1 wherein:
   displaying the image includes displaying a life-size image of the surrogate's location.

3. The method as claimed in claim 1 wherein:
   preserving the user's gaze includes:

displaying the image at a first height; and
moving the image from the first height while the user's eye level changes.

4. The method as claimed in claim 1 wherein:
preserving the user's gaze includes:
displaying a first portion of the image for a first range of the user's eye level; and
displaying a second portion of the image for second range of the user's eye level.

5. A method for mutually-immersive telepresencing comprising:
providing a view of a surrogate's location;
displaying at a user's location an image of the view;
sensing a user's eye level of a user having a user's vertical perspective;
moving the view of the surrogate's location between a first and a second surrogate's height as the user's eye level changes between a first and second user's height; and
preserving the user's vertical perspective and, hence, gaze on the image while the user's eye level changes between the first and second user's height.

6. The method as claimed in claim 5 wherein:
displaying the image includes:
providing a life-size image of the surrogate's location with a perspective distortion;
unwarping the perspective distortion of the life-size image to form an unwarped image with excess image; and
cropping the excess image to display the image life-size with perspective distortion reduced.

7. The method as claimed in claim 5 wherein: preserving the user's gaze includes:
displaying the image with the image having a vertical center; and moving the vertical center in direct proportion to changes in the user's eye level.

8. The method as claimed in claim 5 wherein:
preserving the user's gaze includes tilting the view of the surrogate's location in degrees in inverse direction to changes in the user's eye level.

9. The method as claimed in claim 5 wherein:
preserving the user's gaze includes:
texture mapping the image at the surrogate's location or the user's location to provide a texture-mapped image;
displaying a first portion of the texture mapped image for a first range of the user's eye level;
displaying a second portion of the texture mapped image for a second range of the user's eye level; and
discarding any remaining portion of the texture mapped image not included in the first and second portions of the texture mapped image.

10. A mutually-immersive telepresencing system comprising:
a surrogate having a surrogate's camera for providing a view of a surrogate's location;
a user's display for displaying at a user's location an image of the view;
a user height sensor system for sensing a user having a user's eye level and having a user's perspective, and changing the height of the surrogate camera to match the user's eye level as height of the user changes; and
a user gaze preservation system for preserving the user's gaze on the image while the height of the user and the user's eye level changes.

11. The mutually-immersive telepresencing system as claimed in claim 10 wherein:
the user's display displays a life-size image of the surrogate's location.

12. The mutually-immersive telepresencing system as claimed in claim 10 wherein:
the user gaze preservation system includes:
a projection system for displaying the image at a first height; and
a mechanism for mechanically or optically moving the image from the first height while the user's eye level changes.

13. The mutually-immersive telepresencing system as claimed in claim 10 wherein:
the user gaze preservation system includes a rotary mechanism for tilting the view of the surrogate's location while the user's eye level changes.

14. The mutually-immersive telepresencing system as claimed in claim 10 wherein:
the user gaze preservation system includes:
an electronic system for displaying a first portion of the image for a first range of the user's eye level and for displaying a second portion of the image for second range of the user's eye level.

15. A mutually-immersive telepresencing system comprising:
a surrogate having a surrogate's camera for providing a view of a surrogate's location;
a user's display for displaying at a user's location an image of the view;
a user height sensor system for sensing a user's eye level of the user having a user's vertical gaze;
a system for changing the view of the surrogate's location between a first and a second surrogate's height as the user's eye level changes between a first and a second user's height; and
a user gaze preservation system for preserving the user's vertical gaze on the image while the user's eye level changes between the first and second user's height.

16. The mutually-immersive telepresencing system as claimed in claim 15 wherein:
the user's display includes:
an electronic system for providing a life-size image of the surrogate's location with a perspective distortion, unwarping the perspective distortion of the life-size image to form an unwarped image with excess image, and cropping the excess image to display the image life-size with perspective distortion reduced.

17. The mutually-immersive telepresencing system as claimed in claim 15 wherein:
the user gaze preservation system includes:
a projection system for displaying the image with the image having a vertical center; and
a mechanism for mechanically or optically moving the vertical center in direct proportion to changes in the user's eye level.

18. The mutually-immersive telepresencing system as claimed in claim 15 wherein:
the user gaze preservation system includes a rotary mechanism for tilting the view of the surrogate's location in degrees in inverse proportion to changes in the user's eye level.

19. The mutually-immersive telepresencing system as claimed in claim 15 wherein:
the user gaze preservation system includes:
an electronic system for texture mapping the image at the surrogate's location or the user's location to provide a texture mapped image, for displaying a first portion of the texture mapped image for a first range of the user's eye level, for displaying a second portion of the texture mapped image for a second range of the user's eye level, and for discarding any remaining portion of the texture mapped image not included in the first and second portions of the texture mapped image.

20. The mutually-immersive telepresencing system as claimed in claim 15 wherein: the surrogate's camera is tilted from 22 degrees up to a horizontal plane to 27 degrees down to the horizontal plane.

* * * * *

UNITED STATES PATENT AND TRADEMARK OFFICE
CERTIFICATE OF CORRECTION

PATENT NO. : 7,593,546 B2  Page 1 of 1
APPLICATION NO. : 10/386984
DATED : September 22, 2009
INVENTOR(S) : Norman Paul Jouppi It is certified that error appears in the above-identified patent and that said Letters Patent is hereby corrected as shown below:

In column 11, line 57, in Claim 10, after "sensing" delete "a user having".

In column 11, line 58, in Claim 10, delete "and" and insert -- of a user --, therefor.

In column 11, line 60, in Claim 10, after "as" insert -- a --.

In column 11, line 63, in Claim 10, delete "changes." and insert -- change. --, therefor.

In column 12, line 25, in Claim 15, after "displaying" insert -- to a user --.

In column 12, line 57, in Claim 18, delete "proportion" and insert -- direction --, therefor.

Signed and Sealed this

Second Day of November, 2010

David J. Kappos
*Director of the United States Patent and Trademark Office*